United States Patent
Masini et al.

(10) Patent No.: US 9,504,073 B2
(45) Date of Patent: Nov. 22, 2016

(54) AUTONOMOUS TRANSPORT LAYER CONNECTION SETUP BY A TRANSPORT LAYER CONCENTRATOR

(71) Applicant: Telefonaktiebolaget L M Ericsson (publ), Stockholm (SE)

(72) Inventors: Gino Luca Masini, Stockholm (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 14/383,670

(22) PCT Filed: Mar. 15, 2013

(86) PCT No.: PCT/SE2013/050264
§ 371 (c)(1),
(2) Date: Sep. 8, 2014

(87) PCT Pub. No.: WO2013/137815
PCT Pub. Date: Sep. 19, 2013

(65) Prior Publication Data
US 2015/0016306 A1    Jan. 15, 2015

Related U.S. Application Data

(60) Provisional application No. 61/611,867, filed on Mar. 16, 2012.

(51) Int. Cl.
H04L 12/28 (2006.01)
H04W 76/02 (2009.01)
H04L 12/24 (2006.01)
H04W 92/20 (2009.01)
H04W 84/04 (2009.01)
H04W 80/06 (2009.01)

(52) U.S. Cl.
CPC ........ H04W 76/022 (2013.01); H04L 41/0809 (2013.01); H04W 80/06 (2013.01); H04W 84/045 (2013.01); H04W 92/20 (2013.01)

(58) Field of Classification Search
CPC ....... H04L 45/02; H04L 41/12; H04L 45/00; H04L 45/04; H04W 84/18
See application file for complete search history.

(56) References Cited

U.S. PATENT DOCUMENTS

| | | | | |
|---|---|---|---|---|
| 2006/0176904 | A1* | 8/2006 | Stewart | H04L 45/00 370/467 |
| 2009/0156213 | A1* | 6/2009 | Spinelli | H04W 36/36 455/436 |
| 2009/0316604 | A1* | 12/2009 | Singh | H04W 68/00 370/254 |
| 2011/0243097 | A1* | 10/2011 | Lindqvist | H04W 24/02 370/331 |

(Continued)

OTHER PUBLICATIONS

Catt, "Evaluation on X2 proxy GW between macro eNB and HeNB", 3GPP TSG RAN WG3 Meeting #74, Nov. 14-18, 2011, pp. 1-6, San Francisco, US, R3-112818.

(Continued)

*Primary Examiner* — Mark Rinehart
*Assistant Examiner* — Sanjay K Dewan
(74) *Attorney, Agent, or Firm* — Coats & Bennett, P.L.L.C.

(57) ABSTRACT

The present disclosure concerns wireless communication. More particularly, a method and an apparatus (e.g. a SCTP concentrator) for setting up transport layer connections (e.g. SCTP associations) between a eNB and a (H)eNB are disclosed.

21 Claims, 4 Drawing Sheets

(56) References Cited

U.S. PATENT DOCUMENTS

| | | | | |
|---|---|---|---|---|
| 2013/0322390 A1* | 12/2013 | Xu | ........................ | H04W 92/20 370/329 |
| 2014/0233384 A1* | 8/2014 | Howard | ............ | H04W 28/0289 370/235 |

OTHER PUBLICATIONS

Ericsson (Rapporteur), "X2 SCTP Concentrator Concept—TP for H(e)NB Mobility TR", 3GPP TSG-RAN WG3 #76, May 21-25, 2012, pp. 1-6, Prague, Czech Republic, R3-121279.

Alcatel-Lucent, "X2 Routing Proxy—a third alternative", 3GPP TSG-RAN3 Meeting #76, May 21-25, 2012, pp. 1-6, Prague, Czech Republic, R3-121044.

3rd Generation Partnership Project, "Technical Specification Group RAN; UMTS and LTE; Mobility Enhancements for H(e)NB (Release 11)", 3GPP TR 37.803 V1.0.0, Feb. 2012, pp. 1-73.

Ericsson, "Autonomous X2 Setup through an SCTP Concentrator", 3GPP TSG-RAN WG3 #75bis, Mar. 26, 2012, pp. 1-3, R375b.36, 3GPP, San José del Cabo, Mexico.

Qualcomm Europe, et al., "E-UTRAN architecture for the Home eNode B", 3GPP TSG-RAN WG3 #61m Aug. 18, 2008, pp. 1-5, R3-082276, 3GPP, Jeju Island, Korea.

Ericsson, "Autonomous X2 Setup through an SCTP Concentrator", 3GPP TSG-RAN WG3 #75bis, Mar. 26, 2012, pp. 1-3, R3-120736, 3GPP, San José del Cabo, Mexico.

Ericsson, et al., "SCTP Concentrator: A Simple Solution to a Debated Problem", 3GPP TSG-RAN WG3 #75, Dresden, Germany, Feb. 6, 2012, pp. 1-4, R3-120321, 3GPP.

Nokia Siemens Networks, "X2-proxy", 3GPP TSG RAN WG3 #74 meeting, San Francisco, USA, Nov. 14, 2011, pp. 1-2, R3-113111, 3GPP.

Nokia Siemens Networks (Rapporteur), "X2-proxy", 3GPP TSG RAN WG3 #75 meeting, Dresden, Germany, Feb. 6, 2012, pp. 1-8, R3-120437, 3GPP.

Stewart, R., "Stream Control Transmission Protocol", Memo, Network Working Group Request for Comments: 4960, Category: Standards Track, Sep. 1, 2007, pp. 1-152.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.1.0, Mar. 1, 2012, pp. 1-194, 3GPP, France.

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 11)", Technical Specification, 3GPP TS 36.423 V11.0.0, Mar. 1, 2012, pp. 1-134, 3GPP, France.

3rd Generation Partnership Project, "3rd Generation Partnership Project; Technical Specification Group Radio Access Network; Evolved Universal Terrestrial Radio Access Network (E-UTRAN); S1 Application Protocol (S1AP) (Release 10)", Technical Specification, 3GPP TS 36.413 V10.5.0, Mar. 1, 2012, pp. 1-255, 3GPP, France.

* cited by examiner

AUTONOMOUS TRANSPORT LAYER CONNECTION SETUP BY A TRANSPORT LAYER CONCENTRATOR

TECHNICAL FIELD

The embodiments of the present invention as disclosed herein generally relate to wireless communication, and more particularly, a method and an apparatus for setting up, or initiating, transport layer connections between wireless communication nodes.

BACKGROUND

This section is intended to provide a background to the various embodiments of the invention that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Starting from 3GPP (i.e. $3^{rd}$ Generation Partnership Project) Rel-11 (i.e. Release 11), eNBs (i.e. enhanced Node Bs, or evolved Node Bs) and HeNBs (i.e. Home eNBs) may be allowed to set up and use X2 interfaces between them, under certain conditions. When deploying dense LTE (i.e. Long Term Evolution) networks or in HetNet (heterogeneous network) deployments, it may be necessary to deploy several HeNBs in close proximity of the same macro eNB. In these conditions the same eNB could have dozens of X2 interfaces to neighbor HeNBs. In theory, the number of X2 interfaces to femto neighbors could grow to be very large, possibly even larger than the number of X2 interfaces to other macro eNBs. Each X2 interface is generally carried on top of an SCTP (i.e. Stream Control Transmission Protocol) association with the other node. In order to reduce memory and computational resources requirements on eNB implementations, in some cases it might be desirable to look for solutions to reduce the number of SCTP connections that an eNB has to manage due to its X2 interfaces to its neighbors, e.g. its neighbor HeNBs.

One possible way to reduce the number of SCTP connections between an eNB and its neighbor HeNBs is to introduce a gateway node (X2-GW) between the eNB and the HeNBs, co-located with the HeNB-GW (i.e. HeNB Gateway). See, for instance, R3-120437, "X2-Proxy", Nokia Siemens Networks (Rapporteur). The X2-GW will set up a single X2 interface with the eNB and an individual X2 interface with each HeNB connected to it. It will act as a proxy for all the X2 messages, terminating some messages and transparently forwarding others, appearing as a macro eNB to all connected HeNBs and/or eNBs. This sort of functionality is conceptually very similar to the X2 proxy functionality introduced in DeNBs (Donor ENBs) to support relaying functionality in LTE Rel-10. See, for instance, the technical specification 3GPP TS 36.300.

This approach, however, has several problems. First of all, the introduction of the X2-GW requires modifications to the 3GPP X2AP protocol (i.e. 3GPP X2 Application Protocol), with the risk that the procedures implemented through an X2-AP might diverge from the same procedures implemented on a direct connection. The ultimate risk is an additional cost for macro eNB vendors, who would have to test their eNBs for X2AP twice, first towards other (H)eNBs, and then in the presence of an X2-GW. Second, the dependence on 3GPP releases implies that this concept cannot be reused with older, i.e. earlier, releases, requiring an update of eNBs and HeNBs across the board. Third, deploying an X2-GW requires deploying a HeNB-GW also in cases that did not require it, increasing cost for operators. Fourth, by being co-located with the HeNB-GW, the X2-GW forces X2 signaling to follow strictly the same path as S1 signaling deep into the core network, thereby increasing traffic on the backhaul links and reducing the performance of X2 handovers, i.e. handovers over the X2 interface, notably much faster, over S1 handovers, i.e. handovers over the S1 interface.

Another possibility is to perform concentration at SCTP level, i.e. at transport layer, instead of at X2AP level, i.e. at application layer, introducing an SCTP concentrator. See, for instance, R3-120321, "SCTP Concentrator: A Simple Solution to a Debated Problem", Ericsson, Alcatel-Lucent. The SCTP concentrator leverages the multi-homing and multi-stream capabilities of the SCTP protocol. See, for instance, Internet Engineering Task Force Request For Comments (IETF RFC) 4960: "Stream Control Transmission Protocol" (September 2007).

In this case, all the disadvantages of the X2-GW may disappear, because an SCTP concentrator would be transparent to X2AP and independent of 3GPP releases, and could be deployed separately from the HeNB-GW if present, hence giving the operator the maximum flexibility. With the deployment of an SCTP concentrator between the eNB and the HeNB, the X2 interface is still between the two nodes, but the SCTP concentrator may terminate the underlying SCTP connection. In order for the X2 interface to be set up, however, two separate SCTP associations generally need to be set up, and there is currently no way to set up X2 autonomously in such a scenario. Manual configuration or pre-configuration via Operations & Maintenance (OAM) would be impractical.

SUMMARY

It is in view of the above considerations and others that the various embodiments disclosed herein have been made.

One or more embodiments discussed herein advantageously facilitate the autonomous set up of transport layer connections, e.g. SCTP associations, over which application layer messages, e.g. X2 messages, are to be transparently routed between wireless communication nodes, e.g. eNBs and HeNBs. This autonomous connection set up advantageously minimizes the number of transport layer connections that a given node, e.g., an eNB, must manage, while at the same time avoiding modifications to the application layer and minimizing manual connection configuration.

More particularly, and according to a first aspect, one or more embodiments herein include a method implemented by a transport layer concentrator for setting up transport layer connections over which application layer messages are to be sent between first and second wireless communication nodes.

The method entails receiving a connection setup request, e.g., an SCTP INIT chunk, from the first node that indicates network layer addresses, e.g. Internet Protocol (IP) addresses, for both the concentrator and the second node. The method then includes setting up a first transport layer connection to the first node in accordance with the request, i.e. in accordance with the set-up request. Furthermore, the method entails, based on the network layer addresses indicated by the request, autonomously setting up a second transport layer connection to the second node. Autonomously in this sense means that the second connection is set up on the concentrator's own initiative, without request from the second node. Finally, the method includes routing application layer messages between the first and second nodes over the first and second connections. Routing application layer messages between the first and second nodes over the first and second connections may comprise transparently routing the application layer messages between the first and second nodes over the first and second connections.

In one or more embodiments, autonomous set up of the second connection, i.e. the second transport layer connection, advantageously occurs based on the transport layer concentrator inspecting the received connection setup request and recognizing or otherwise determining that the request indicates a network layer address not belonging to the concentrator, i.e. a network layer address that instead belongs to the second node. That is, the transport layer concentrator intelligently determines that the first node is implicitly requesting the set up of a transport layer connection between the concentrator and the second node, in addition to one or more transport layer connections between the concentrator and the first node. Based on this determination, the concentrator autonomously sets up the implicitly requested transport layer connection.

In at least some embodiments, the concentrator's autonomous setup of the second transport layer connection to the second node entails the concentrator actually initiating or otherwise triggering such a setup. For example, in one or more embodiments, the concentrator autonomously sends a connection setup request to the second node that indicates a network layer address of that second node. In this way, the first node's sending of a connection request to the concentrator effectively triggers the concentrator to send a connection request to the second node.

In this regard, the concentrator in some embodiments immediately sets up the second connection responsive to receiving the connection setup request from the first node. In other embodiments, by contrast, the concentrator delays set up of the second connection until an application layer message is to be sent over that connection.

With regard to these latter embodiments, the concentrator's autonomous setup of the second connection is thus more specifically triggered by the concentrator receiving an application layer message from the first node, e.g. an X2 SETUP REQUEST message. In this case, such receipt prompts the concentrator to inspect the connection setup request previously received from the first node in order to determine the network layer address of the second node and set up the second connection.

In more detail, setup of the first and second connections may involve negotiating one or more logical channels, e.g. SCTP streams, to be employed on those connections. That is, the concentrator and the first node agree on logical channels to be used on the first connection, e.g., by determining identifiers to be used for those channels, and the concentrator and the second node separately agree on logical channels to be used on the second connection. In this case, the concentrator in one or more embodiments terminates the first and second connections and effectively operates as a gateway between them, based on a mapping between the logical channels on those connections.

More particularly, processing at the concentrator in some embodiments involves, based on the network layer addresses indicated by the request from the first node, autonomously mapping one or more logical channels on the first connection to one or more logical channels on the second connection. This mapping may be maintained in a look-up table, a routing table, or the like, and may be stored in a memory or database associated with the concentrator. Regardless, having created this mapping between logical channels on the connections, the concentrator transparently routes application layer messages based on that mapping. Transparent routing as used herein refers to routing the application layers messages without inspecting or otherwise modifying those messages. Indeed, rather than inspecting any information contained within the application layer messages, the concentrator accomplishes such transparent routing based on the mapping between logical channels.

Note that although the above description of mapping was limited for explanatory purposes to a mapping between logical channels on the first and second connections, the concentrator may maintain a mapping between the logical channels on any number of connections. For example, in at least some embodiments, the wireless communication system is a hierarchical system that structures wireless communication nodes at different hierarchical levels, e.g., for providing wireless communication coverage over different sized areas. In LTE embodiments, for instance, the system may include an eNB at a macro level and a HeNB at a femto level. Regardless, the concentrator in this case may setup only a single transport layer connection to a relatively higher-level wireless node, while setting up multiple different transport layer connections to different lower-level wireless nodes. In doing so, the concentrator may map different logical channels on the single connection to the higher-level node to different logical channels on different connections to the lower-level nodes. In one example embodiment, the application layer is the X2 layer, the transport layer is the SCTP layer, and a logical channel is an SCTP stream.

Note that the first connection discussed above may correspond to either a connection to a higher-level node or to a connection to a lower-level node. The same may be said of the second connection. In a broad sense, therefore, the method may further include setting up a third transport layer connection to a third wireless communication node, and mapping different logical channels on the first connection to logical channels on different ones of the second and third connections.

According to another aspect, one or more embodiments herein include an exemplary transport layer concentrator operative to perform the method of the first aspect. The concentrator, i.e. the transport layer concentrator, includes one or more interfaces, and one or more processing circuits. The one or more interfaces are configured to communicatively couple the concentrator to the first and second wireless communication nodes, e.g., via a protocol stack.

The one or more processing circuits are configured to carry out the method of the first aspect, described previously. The processing circuits may functionally include a request controller, a setup controller, and a routing controller. The request controller is configured to receive a connection setup request, e.g. an SCTP INIT chunk, from the first wireless communication node that indicates network layer addresses, e.g. IP addresses, for both the transport layer concentrator and the second wireless communication node. The request controller in this regard may be configured to inspect or otherwise examine the request in order to determine that the request indicates such addresses.

The setup controller is configured to set up a first transport layer connection to the first wireless communication node in accordance with the connection setup request. The setup controller is also configured, based on the network layer addresses indicated by the connection setup request, to autonomously set up a second transport layer connection to the second wireless communication node. Finally, the routing controller is configured to route, e.g. transparently route, application layer messages between the first and second wireless communication nodes over the first and second transport layer connections.

Those skilled in the art will of course appreciate that the depicted circuits and controllers may be realized, implemented, or otherwise configured within the node, based upon the execution of computer program instructions stored in memory or within another computer readable medium in the entity.

Those skilled in the art will also appreciate counterpart processing performed in the first wireless communication node discussed above, i.e. for setting up transport layer connections over which application layer messages are to be sent to a second wireless communication node.

According to a third aspect, processing at the first wireless communication node entails generating a connection setup request that indicates network layer addresses for both a transport layer concentrator and the second node. In generating the request in this way, the first node implicitly requests the concentrator to set up a transport layer connection between the concentrator and the second node, in addition to one or more transport layer connections between the concentrator and the first node. Processing at the first node then includes sending the connection setup request to the transport layer concentrator.

Those skilled in the art will appreciate additional processing performed by the first node consistent with the description above, such as negotiation of logical channels on the first connection, the sending of application layer messages, and the like.

According to a fourth aspect, there is provided an exemplary first wireless communication node operative to perform the method according to the third aspect described above. The first node includes one or more interfaces, and one or more processing circuits. The one or more interfaces are configured to communicatively couple the first node to the concentrator and the second node, e.g., via a protocol stack.

The one or more processing circuits are configured to carry out the method of the third aspect. The processing circuits may functionally include a request controller. The request controller is configured to generate the connection setup request as described above, and to send that request to the transport layer concentrator.

Again, those skilled in the art will of course appreciate that the depicted circuits and controllers may be realized, implemented, or otherwise configured within the node, based upon the execution of computer program instructions stored in memory or within another computer readable medium in the entity.

Those skilled in the art will also appreciate that the above embodiments are not limited to any particular communication protocols. The transport layer, for example, may be implemented according to any communication protocol that provides multiple logical channels within any given transport layer connection, e.g., multi-streaming, and that provides for multiple transport layer connections to be established between any two nodes, e.g., multi-homing.

Nonetheless, in terms of particular protocols, embodiments herein may leverage the multi-homing capability of SCTP, i.e. the possibility to indicate more than one IP address for the endpoints of the SCTP association. When the (H)eNB initiates the SCTP association to the SCTP concentrator, it shall indicate the IP address of the final destination node, e.g. the other (H)eNB, within the SCTP INIT chunk, together with the IP address(es) of the SCTP concentrator. The SCTP concentrator will understand that the additional IP address provided belongs to another node because the other address(es) given are its own. It will then set up another SCTP association with the final destination node and forward all subsequent X2AP messages on that connection.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The invention will now be described more fully hereinafter with reference to the accompanying drawings, in which certain embodiments are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As will be appreciated, one or more embodiments herein advantageously facilitate the autonomous set up of transport layer connections, e.g. SCTP associations, over which application layer messages, e.g., X2 messages, are to be routed between wireless communication nodes, e.g., eNBs and HeNBs. This autonomous connection set up advantageously minimizes the number of transport layer connections that a given node, e.g., an eNB, must manage, while at the same time avoiding modifications to the application layer and minimizing manual connection configuration.

Figure 1:
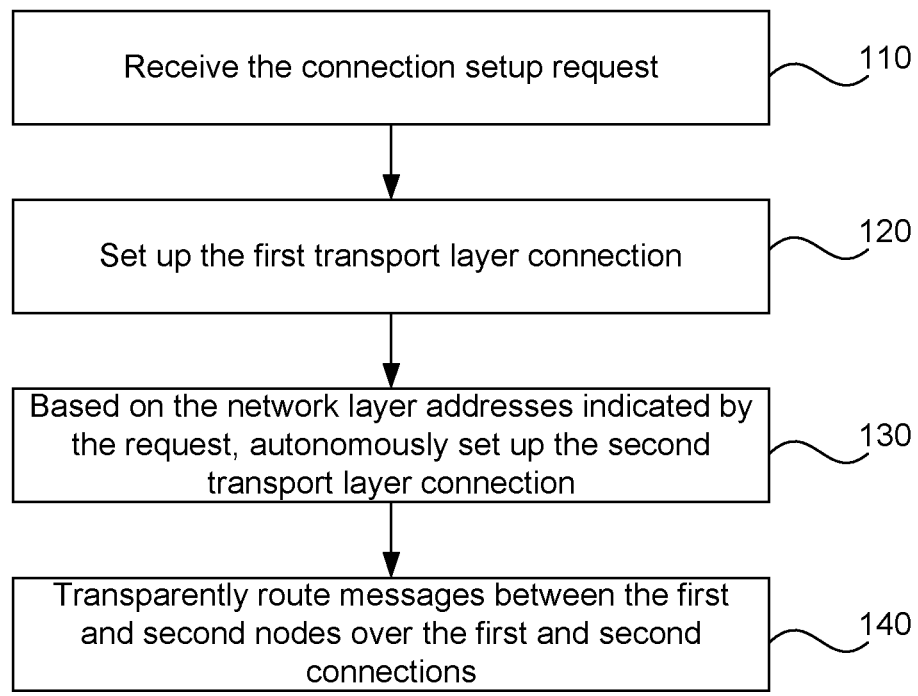
FIG. 1 illustrates an example of a method in a transport layer concentrator according to one or more embodiments disclosed herein.

FIG. 1 illustrates an example embodiment of a method implemented or otherwise performed by a transport layer concentrator, e.g. a SCTP concentrator, for setting up transport layer connections over which application layer messages are to be sent between a first wireless communication node, e.g. eNB, and a second wireless communication node, e.g. HeNB.

As shown in FIG. 1, the method comprises receiving 110 a connection setup request, e.g. an SCTP INIT chunk, from the first node that indicates network layer addresses, e.g. IP addresses, for both the concentrator and the second node. In other words, the connection request may comprise network layer addresses, e.g. IP addresses, for both the concentrator and the second node. The method then includes setting up 120, or initiate, a first transport layer connection to the first node. Thus, the method may comprise setting up the first transport layer connection in accordance with the request.

Furthermore, the method comprises, based on the network layer addresses indicated by the request, autonomously setting up 130 a second transport layer connection to the second node. To this end, the method may comprise reading or otherwise retrieving the network layer addresses, e.g. IP addresses, from the set-up request received from the first node and, furthermore, using these network layer addresses for setting up the second transport layer connection to the second node. Autonomously in this sense is used to mean that the second connection is set up on the concentrator's own initiative, i.e. without request from the second node. Finally, the method includes routing 140 application layer messages between the first and second nodes over the first and second connections.

The routing 140 of application layer messages between the first and second nodes may comprise transparently routing the application layer messages between the first and second nodes over the first and second connections. As used herein, transparent routing of application layer messages should be understood to mean that the routing of application layer messages is done without inspecting or otherwise modifying these messages.

In one or more embodiments, autonomous set up of the second connection advantageously occurs based on the transport layer concentrator inspecting the received connection setup request and recognizing or otherwise determining that the request indicates a network layer address not belonging to the concentrator, i.e., a network layer address that instead belongs to the second node. That is, the transport layer concentrator intelligently determines that the first node is implicitly requesting the set up of a transport layer connection between the concentrator and the second node, in addition to one or more transport layer connections between the concentrator and the first node. Based on this determination, the concentrator autonomously sets up the implicitly requested transport layer connection.

In at least some embodiments, the concentrator's autonomous setup of the second transport layer connection to the second node comprises the concentrator actually initiating or otherwise triggering such a setup. For example, in one or more embodiments, the concentrator autonomously sends a connection setup request to the second node that indicates a network layer address of that second node. That is, this connection set-up request may comprise the network layer address of that second node. In this way, the first node's sending of a connection request to the concentrator effectively triggers the concentrator to send a connection request to the second node.

In this regard, the concentrator in some embodiments immediately sets up the second connection responsive to receiving the connection setup request from the first node. In other embodiments, by contrast, the concentrator delays set up of the second connection until an application layer message is to be sent over that connection.

With regard to these latter embodiments, the concentrator's autonomous setup of the second connection is thus more specifically triggered by the concentrator receiving an application layer message from the first node, e.g., an X2 SETUP REQUEST message. In this case, such receipt may prompt the concentrator to inspect the connection setup request previously received from the first node in order to determine the network layer address of the second node and set up the second connection.

In more detail, setup of the first and second connections may involve negotiating one or more logical channels, e.g., SCTP streams, to be employed on those connections. That is, the concentrator and the first node agree on logical channels to be used on the first connection, e.g., by determining identifiers to be used for those channels, and the concentrator and the second node separately agree on logical channels to be used on the second connection. In this case, the concentrator in one or more embodiments terminates the first and second connections and effectively operates as a gateway between them, e.g. based on a mapping between the logical channels on those connections.

More particularly, processing at the concentrator in some embodiments involves, based on the network layer addresses indicated by the request from the first node, autonomously mapping one or more logical channels on the first connection to one or more logical channels on the second connection. This mapping may be maintained in a look-up table, a routing table, or the like, and may be stored in a memory or database associated with or included within the concentrator. Regardless, having created this mapping between logical channels on the connections, the concentrator may transparently route application layer messages based on that mapping. Again, transparent routing as used herein refers to routing the application layers messages without inspecting or otherwise modifying those messages. Indeed, rather than inspecting any information contained within the application layer messages, the concentrator may accomplish such transparent routing based on the created mapping between logical channels.

Figure 7:
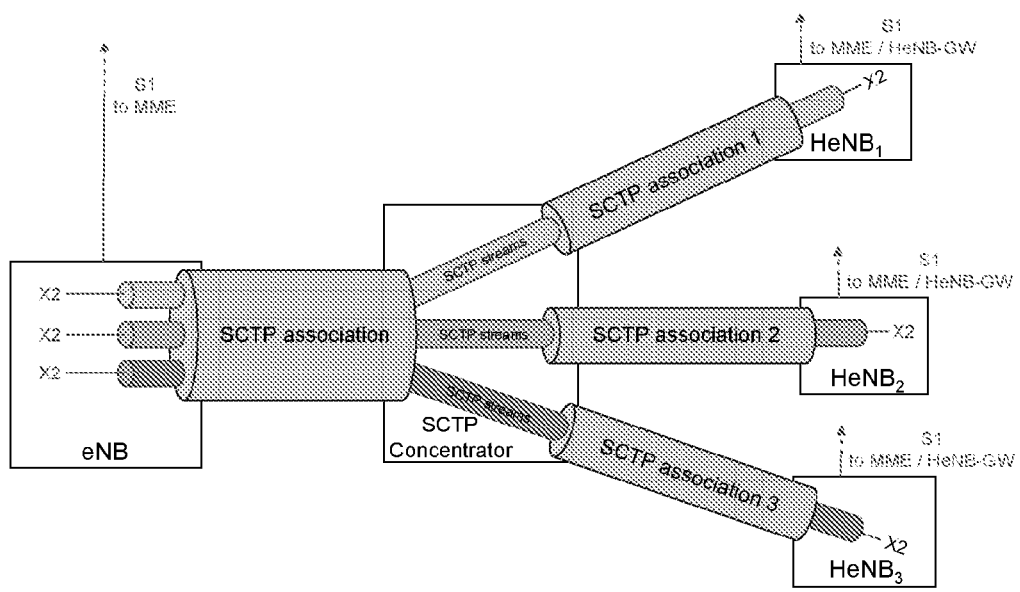
FIG. 7 shows exemplary SCTP streams, which are switched into different SCTP associations by a SCTP concentrator.

Note that although the above description of mapping is limited for explanatory purposes to a mapping between logical channels on the first and second connections, the concentrator may maintain a mapping between the logical channels on any number of connections. For example, in at least some embodiments, the wireless communication system may be a hierarchical system that structures wireless communication nodes at different hierarchical levels, e.g., for providing wireless communication coverage over different sized areas. In LTE embodiments, for instance, the system may include an eNB at a macro level and a HeNB at a femto level. Regardless, the concentrator in this case may setup only a single transport layer connection to a relatively higher-level wireless node, while setting up multiple different transport layer connections to different lower-level wireless nodes. In doing so, the concentrator may map different logical channels on the single connection to the higher-level node to different logical channels on different connections to the lower-level nodes. See for example FIG. 7 for an example of this in a context where the application layer is the X2 layer, the transport layer is the SCTP layer, and a logical channel is an SCTP stream. FIG. 7 will be further described herein below.

Note that the first connection discussed above may correspond to either a connection to a higher-level node or to a connection to a lower-level node. The same may be said of the second connection. In a broad sense, therefore, the method in FIG. 1 may further include setting up a third transport layer connection to a third wireless communication node, and mapping different logical channels on the first connection to logical channels on different ones of the second and third connections.

Figure 2:
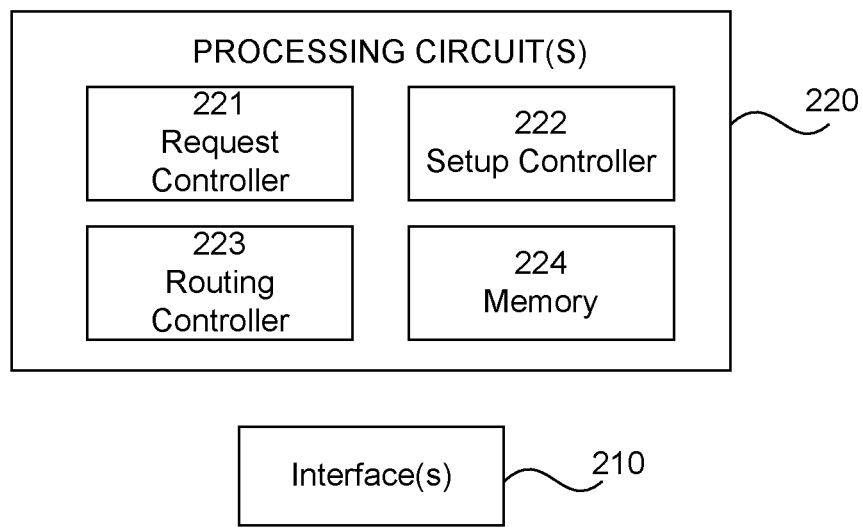
FIG. 2 illustrates a concentrator, e.g. a transport layer concentrator, according to one or more embodiments disclosed herein.

FIG. 2 depicts an exemplary embodiment of a transport layer concentrator 200 operative to perform the processing shown in FIG. 1. As shown in FIG. 2, the concentrator 200 includes one or more interfaces 210, and one or more processing circuits 220. The one or more interfaces 210 are configured to communicatively couple the concentrator to the first and second wireless communication nodes, e.g., via the protocol stack shown in FIG. 6. The protocol stack of FIG. 6 will be further explained herein below.

The one or more processing circuits 220 are configured to carry out the processing shown in FIG. 1. The processing circuits 220 may functionally include a request controller 221, a setup controller 222, and a routing controller 223. The processing circuits may also include a memory 224. The request controller 221 is configured to receive a connection setup request, e.g., an SCTP INIT chunk, from the first node that indicates network layer addresses, e.g., IP addresses, for both the concentrator and the second node. The request controller 221 in this regard may be configured to inspect or otherwise examine the request in order to determine that the request indicates such addresses.

The setup controller 222 is configured to set up a first transport layer connection to the first node in accordance with the request. The setup controller 222 is also configured, based on the network layer addresses indicated by the request, to autonomously set up a second transport layer connection to the second node. Finally, the routing controller 223 is configured to route (e.g. transparently route) application layer messages between the first and second nodes over the first and second connections. The routing controller 223 may, for example, also be configured to transparently route application layer messages between the first and second nodes over the first and second connections.

Those skilled in the art will of course appreciate that the FIG. 2 is an example, and that the depicted circuits and controllers may be realized, implemented, or otherwise configured within the node, based upon the execution of computer program instructions stored in memory or within another computer readable medium in the entity.

Figure 3:
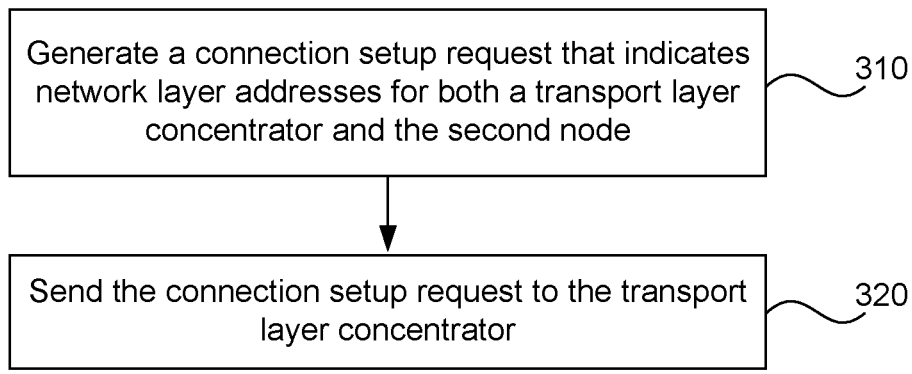
FIG. 3 illustrates an example method in a first wireless communication node according to one or more embodiments disclosed herein.

Those skilled in the art will also appreciate counterpart processing performed in the first wireless communication node discussed above. FIG. 3 illustrates such processing for setting up transport layer connections over which application layer messages are to be sent to a second wireless communication node.

As shown in FIG. 3, processing at the first node comprises generating 310 a connection setup request that indicates network layer addresses for both a transport layer concentrator and the second node. In generating the request in this way, the first node can be said to implicitly request the concentrator to set up a transport layer connection between the concentrator and the second node, e.g. in addition to one or more transport layer connections between the concentrator and the first node. Processing at the first node then additionally includes sending 320, i.e. transmitting, the connection setup request to the transport layer concentrator.

Those skilled in the art will appreciate additional processing performed by the first node consistent with the description above, such as negotiation of logical channels on the first connection, the sending of application layer messages, and the like.

Figure 4:
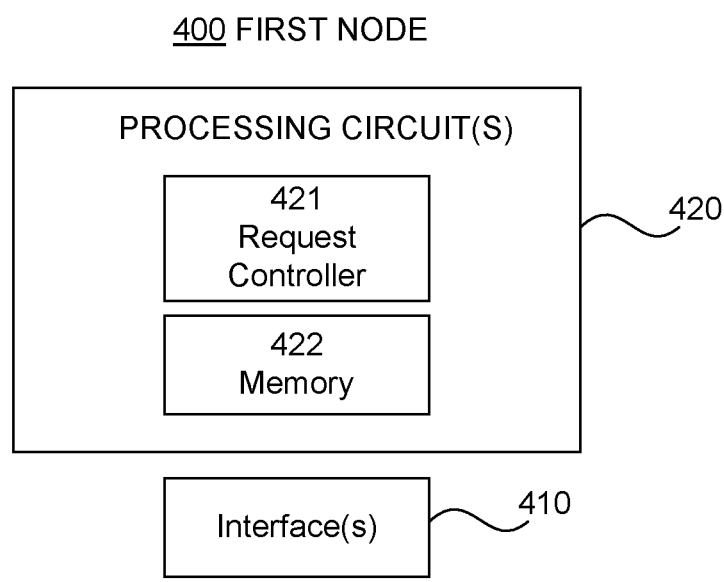
FIG. 4 illustrates a first wireless communication node according to one or more embodiments disclosed herein.

FIG. 4 depicts an exemplary first wireless communication node 400 operative to perform the processing shown in FIG. 3. As shown in FIG. 4, the first node 400 includes one or more interfaces 410, and one or more processing circuits 420. The one or more interfaces 410 are configured to communicatively couple the first node to the concentrator and the second node, e.g., via the protocol stack shown in FIG. 6.

The one or more processing circuits 420 are configured to carry out the processing shown in FIG. 3. The processing circuits 420 may functionally include a request controller 421. The request controller 421 is configured to generate the connection setup request as described above, and to send that request to the concentrator.

Those skilled in the art will appreciate that the figure is an example, and that the depicted circuits and controllers may be realized, implemented, or otherwise configured within the node, based upon the execution of computer program instructions stored in memory or within another computer readable medium in the entity.

Those skilled in the art will also appreciate that the above embodiments are not limited to any particular communication protocols. The transport layer, for example, may be implemented according to any communication protocol that provides multiple logical channels within any given transport layer connection, e.g. multi-streaming, and that provides for multiple transport layer connections to be established between any two nodes, e.g., multi-homing. In terms of particular protocols, embodiments herein leverage the multi-homing capability of SCTP, i.e. the possibility to indicate more than one IP address for the endpoints of the SCTP association. When the (H)eNB, i.e. HeNB or eNB, initiates the SCTP association to the SCTP concentrator, it may indicate the IP address of the final destination node, that is, the other (H)eNB (i.e. the other HeNB or eNB), within the SCTP INIT chunk, together with the IP address(es) of the SCTP concentrator. The SCTP concentrator will understand that the additional IP address provided belongs to another node because the other address(es) given are its own. It will then set up another SCTP association with the final destination node and forward all subsequent X2AP messages on that connection.

Figure 5:
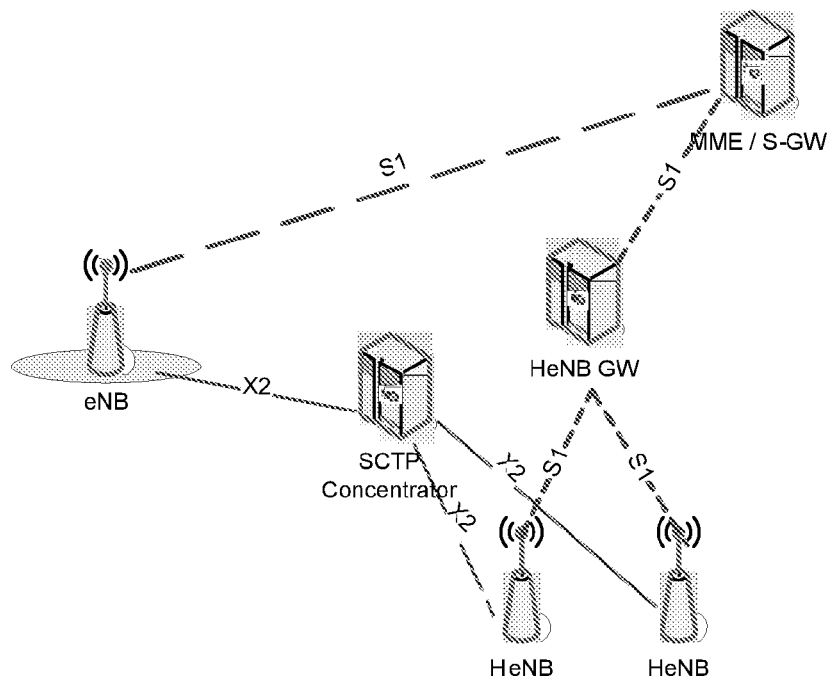
FIG. 5 shows a logical network architecture for an SCTP concentrator.

With respect to FIG. 5, an exemplary wireless communication system according to one or more embodiments is shown. As can be seen from FIG. 5, the system may include an eNB, two HeNBs, an SCTP concentrator, a HeNB GW, and an MME/S-GW, i.e. Mobility Management Entity/Serving Gateway.

The SCTP concentrator may act as a proxy, e.g. an IP proxy, between the eNB and its HeNB neighbors. The SCTP concentrator may allow for minimizing the number of transport layer connections that a given node, e.g. the eNB, must manage, while at the same time avoiding modifications to the application layer and minimizing manual connection configuration.

It should be appreciated that the SCTP concentrator could also reside in the same physical node as HeNB GW, if deployed, even if this would not be necessary. If the SCTP concentrator and the HeNB GW are residing in the same physical node, the "two" logical nodes may have the same IP address. Then, the HeNBs may also be pre-configured with the address of the SCTP concentrator. Nevertheless, by providing the SCTP concentrator and the HeNB GW as separate physical nodes a higher flexibility for the operator can be achieved.

Figure 6:
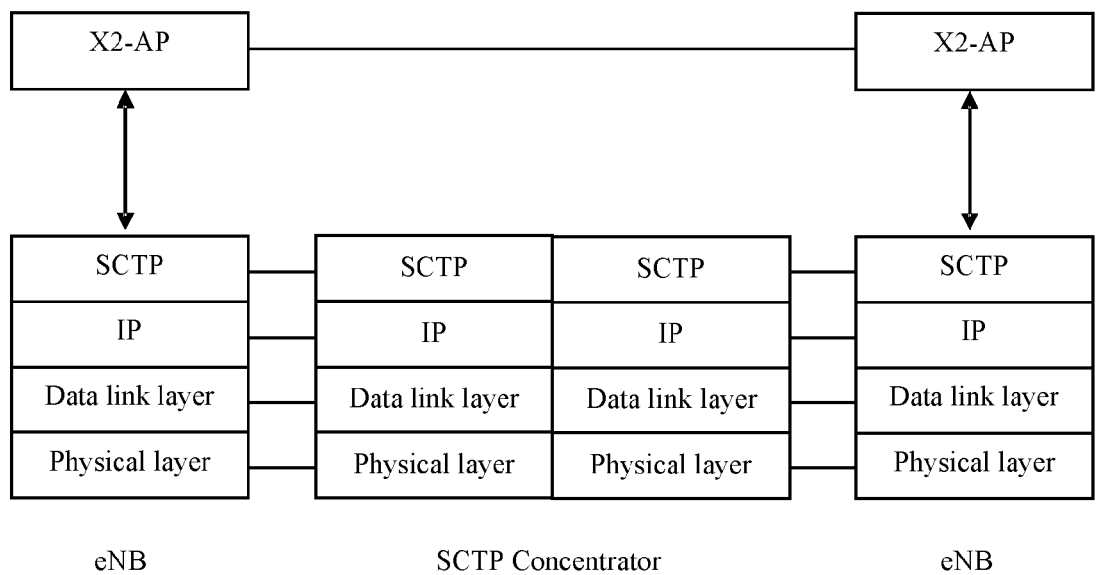
FIG. 6 shows an exemplary protocol stack for the X2 interface over an SCTP concentrator.

Communication between an eNB, a SCTP concentrator, and a HeNB in this system occurs according to the protocol stack indicated in FIG. 6. FIG. 6 illustrates a protocol stack for the X2 control plane with the presence of an SCTP concentrator. A single SCTP association per X2-C interface instance can be used with one pair of stream identifiers for X2-C common procedures. An SCTP concentrator can terminate the lower layers such that the eNB does not need to be aware that several nodes, with which it maintains X2 interfaces, are actually behind the concentrator.

Some of the characteristics of the protocol stack of FIG. 6 are:

There is a single X2AP association, i.e. application layer, between the eNB and each HeNB;

There is a single SCTP association, i.e. transport layer, between the eNB and the SCTP concentrator;

There is a single SCTP association, i.e. transport layer, between the SCTP concentrator and each HeNB connected to it;

The SCTP concentrator does not involve the application layer; and

For each HeNB, the SCTP may map the X2AP signaling on the appropriate SCTP association, switching between the various SCTP streams from the X2 interface between itself and the eNB.

It should be appreciated that, in principle, the presence of the SCTP concentrator does not necessarily prevent a HeNB from setting up a direct X2 interface with another (H)eNB.

More specifically, communication according to the protocol stack shown in FIG. 6 occurs via SCTP streams as schematically shown in FIG. 7. SCTP provide multi-streaming capabilities. The eNB can map X2AP signaling for different HeNBs on different streams over the same SCTP association. The SCTP concentrator may receive the messages, terminate the SCTP connection, and map each message on a new SCTP association towards the appropriate HeNB according to a stream number used. Since there can be up to, e.g., 65535 streams in an SCTP association, in principle it is possible to address a large number of HeNBs from the same eNB. The SCTP concentrator may handle the appropriate switching between each stream number on the SCTP concentrator-macro eNB association and each HeNB-SCTP concentrator association, as schematically illustrated in FIG. 7. This functionality may be completely contained in the SCTP concentrator and only requires that the (H)eNBs map X2AP signaling to different peers, on different SCTP stream identifiers.

Next, more detailed embodiments relating to the autonomous X2 setup through the SCTP concentrator will be described.

In a first embodiment, one of the HeNBs pictured in FIG. 5 needs or wishes to set up X2 with the macro eNB.

The first embodiment includes the following steps:

1 The HeNB obtains the Transport Network Layer (TNL) address of the eNB, e.g. either by doing a Domain Name System (DNS) lookup toward the core network, or by sending an S1AP eNB CONFIGURATION TRANSFER message to the MME, i.e. a eNB CONFIGURATION TRANSFER message over the S1 interface, comprising the eNB ID, i.e. identification, to look up, and reading the corresponding address in the answer, S1AP MME CONFIGURATION TRANSFER from the MME.

2 The HeNB sets up an SCTP association with the SCTP concentrator, negotiating a suitable set of SCTP stream identifiers. In the SCTP INIT chunk, the HeNB indicates both the address(es) of the concentrator and the address of the eNB.

3 The HeNB sends the X2 SETUP REQUEST to the SCTP concentrator.

4 The SCTP concentrator reads the eNB address from the SCTP INIT chunk and understands that the additional IP address provided belongs to another node because the other address(es) given are its own.

5 The SCTP concentrator sets up an SCTP association with the eNB, negotiating a suitable set of SCTP stream identifiers. The concentrator also maps the stream identifiers from the SCTP association with the eNB, to the stream identifiers from the SCTP association with the HeNB.

6 The concentrator forwards the X2 SETUP REQUEST to the eNB.

7 Assuming a positive response, the eNB replies with X2 SETUP RESPONSE to the concentrator.

8 Based on the mapping between SCTP streams in Step 5 above, the concentrator forwards the X2 SETUP RESPONSE to the HeNB and the procedure ends successfully.

Steps 7 and 8 above may be conceptually similar also in case of negative response, i.e. if the eNB should reply with X2 SETUP FAILURE.

In a second embodiment, the macro eNB pictured in FIG. 5 needs or wishes to set up X2 with one of the HeNBs.

1 The HeNB has already indicated both its address and the external IP address, i.e. the IP address toward the macro network, of the to SCTP concentrator to the MME, e.g. using the X2 TNL Configuration Info IE in the S1AP eNB CONFIGURATION TRANSFER message.

2 The eNB sends an eNB CONFIGURATION TRANSFER message to the MME, comprising the HeNB ID to look up. The MME answers with the IP addresses of both the HeNB and the SCTP concentrator in the MME CONFIGURATION TRANSFER message. Alternatively, a DNS query could also be performed.

3 The eNB sets up an SCTP association with the SCTP concentrator, negotiating a suitable set of SCTP stream identifiers. In the SCTP INIT chunk, the eNB indicates both the address(es) of the SCTP concentrator and the address of the HeNB.

4 The SCTP concentrator reads the HeNB address from the SCTP INIT chunk and understands that the additional IP address provided belongs to another node because the other address(es) given are its own.

5 The eNB sends the X2 SETUP REQUEST to the SCTP concentrator.

6 The SCTP concentrator reads the HeNB address from the SCTP INIT chunk and sets up an SCTP association with the HeNB, negotiating a suitable set of SCTP stream identifiers. The concentrator also maps the stream identifiers from the SCTP association with the HeNB, to the stream identifiers from the SCTP association with the eNB.

7 The concentrator forwards the X2 SETUP REQUEST to the HeNB.

8 Assuming a positive response, the HeNB replies with X2 SETUP RESPONSE to the concentrator.

9 Based on the mapping between SCTP streams in Step 4 above, the concentrator forwards the X2 SETUP RESPONSE to the eNB and the procedure ends.

Steps 8 and 9 above may be conceptually similar also in case of negative response, i.e. if the eNB should reply with X2 SETUP FAILURE.

Both embodiments enable eNBs and HeNBs to set up X2 interfaces autonomously between them through the SCTP concentrator in a totally transparent way, as if the SCTP concentrator was not deployed. It is worth noting that the SCTP concentrator forwards X2AP messages transparently without opening them, simply basing its routing on the multi-homing properties of SCTP. Therefore, the SCTP concentrator introduces very little processing delay. By having this functionality in the transport layer (SCTP) instead of the application layer (X2AP), the SCTP concentrator is independent of the 3GPP release in use and can also be used with (H)eNBs of different releases. By mapping the SCTP stream identifiers on either end, it is also possible to further optimize and discriminate the signaling traffic from several HeNBs into the same eNB, if desired.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation. Therefore, the technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method, performed by a transport layer concentrator, for setting up transport layer connections over which application layer messages are to be sent between first and second wireless communication nodes, the method comprising:
   receiving a connection setup request from the first node that indicates network layer addresses for both the concentrator and the second node;
   setting up a first transport layer connection to the first node in accordance with the setup request;
   based on the network layer addresses indicated by the request, autonomously setting up a second transport layer connection to the second node; and
   routing application layer messages between the first and second nodes over the first and second connections.

2. The method of claim 1, wherein autonomously setting up a second transport layer connection to the second node comprises setting up the second connection on the transport layer concentrator's own initiative, without any request from the second node.

3. The method of claim 1, wherein routing application layer messages between the first and second nodes over the first and second connections comprises transparently routing application layer messages between the first and second nodes over the first and second connections, wherein transparently routing comprises routing the application layers messages without inspecting or otherwise modifying those messages.

4. The method of claim 1, wherein autonomously setting up a second transport layer connection to the second node comprises:
   inspecting the received connection setup request; and
   determining that the connection setup request indicates a network layer address belonging to the second node.

5. The method of claim 1, wherein autonomously setting up the second transport layer connection to the second node comprises autonomously sending a connection setup request to the second node that indicates a network layer address of that second node.

6. The method of claim 1, wherein the setup of the second connection is delayed until an application layer message is to be sent over that second connection.

7. The method of claim 6, wherein the autonomously setting up the second connection is triggered by receiving an application layer message from the first node.

8. The method of claim 7, wherein the application layer message from the first node is an X2 SETUP REQUEST message.

9. The method of claim 7, wherein receiving an application layer message from the first node prompts the transport layer concentrator to inspect the connection setup request previously received from the first node in order to determine the network layer address of the second node and set up the second connection to the second node.

10. The method of claim 1, wherein setting up the first and second connections comprises negotiating one or more logical channels to be employed on those connections and autonomously mapping one or more logical channels on the first connection to one or more logical channels on the second connection based on the network layer addresses indicated by the request from the first node.

11. The method of claim 10, wherein routing of application layer messages between the first and second nodes over the first and second connections is performed based on the mapping.

12. The method of claim 10, wherein:
   the application layer is a X2 layer;
   the transport layer is a Stream Control Transmission Protocol (SCTP) layer; and
   the one or more logical channels comprise SCTP streams.

13. The method of claim 1, wherein one of the first connection and the second connection corresponds to a connection to a relatively higher-level node and the other one of the first connection and the second connection corresponds to a connection to a connection to a lower-level node.

14. The method of claim 13, wherein the higher-level node is an evolved NodeB (eNB) and the lower-level node is a Home eNB.

15. The method of claim 1, wherein the connection setup request is a request by the first node for setup of the first transport layer connection between the transport layer concentrator and the first node.

16. The method of claim 15, wherein the connection setup request is a Stream Control Transmission Protocol (SCTP) INIT chunk.

17. A method, implemented by a first wireless communication node, for setting up transport layer connections over which application layer messages are to be sent to a second wireless communication node, the method comprising:
   generating a connection setup request that indicates network layer addresses for both a transport layer concentrator and the second node; and
   sending the connection setup request to the transport layer concentrator.

18. A transport layer concentrator for setting up transport layer connections over which application layer messages are to be sent between first and second wireless communication nodes, the transport layer concentrator comprising:
   one or more processing circuits configured to function as:
      a request controller configured to receive a connection setup request from the first wireless communication node, the connection setup request indicating network layer addresses for both the transport layer concentrator and the second wireless communication node;

a setup controller configured to:
  set up a first transport layer connection to the first wireless communication node in accordance with the connection setup request; and
  based on the network layer addresses indicated by the connection setup request, autonomously set up a second transport layer connection to the second wireless communication node; and
a routing controller configured to route application layer messages between the first and second wireless communication nodes over the first and second transport layer connections.

19. The transport layer concentrator of claim 18, wherein the transport layer concentrator is a Stream Control Transmission Protocol (SCTP) concentrator.

20. A first wireless communication node for setting up transport layer connections over which application layer messages are to be sent to a second wireless communication node, the first wireless communication node comprising:
  one or more processing circuits configured to function as a request controller configured to:
    generate a connection setup request that indicates network layer addresses for both a transport layer concentrator and the second node;
    send the connection setup request to the transport layer concentrator.

21. The first wireless communication node of claim 20, wherein the first wireless communication node is an evolved NodeB (eNB).

* * * * *